(12) United States Patent
Ehrentraut

(10) Patent No.: US 12,132,506 B2
(45) Date of Patent: Oct. 29, 2024

(54) TRANSMITTING/RECEIVING DEVICE FOR A MOTOR VEHICLE AND MOTOR VEHICLE HAVING SUCH A TRANSMITTING/RECEIVING DEVICE

(71) Applicant: AUDI AG, Ingolstadt (DE)

(72) Inventor: Herbert Ehrentraut, Beilngries (DE)

(73) Assignee: AUDI AG, Ingolstadt (DE)

( * ) Notice: Subject to any disclaimer, the term of this patent is extended or adjusted under 35 U.S.C. 154(b) by 368 days.

(21) Appl. No.: 17/616,874

(22) PCT Filed: Jun. 2, 2020

(86) PCT No.: PCT/EP2020/065130
§ 371 (c)(1),
(2) Date: Dec. 6, 2021

(87) PCT Pub. No.: WO2020/245075
PCT Pub. Date: Dec. 10, 2020

(65) Prior Publication Data
US 2022/0321150 A1 Oct. 6, 2022

(30) Foreign Application Priority Data

Jun. 6, 2019 (DE) ..................... 10 2019 208 249.1

(51) Int. Cl.
*G01S 13/931* (2020.01)
*H01Q 1/24* (2006.01)
(Continued)

(52) U.S. Cl.
CPC .......... *H04B 1/0057* (2013.01); *G01S 13/931* (2013.01); *H01Q 1/24* (2013.01);
(Continued)

(58) Field of Classification Search
CPC .. H04B 1/0057; H04B 1/0067; H04B 1/3822; H04B 1/005; H04B 1/40; H04B 7/043;
(Continued)

(56) References Cited

U.S. PATENT DOCUMENTS 7,675,472 B2   3/2010 Mikami et al.
9,176,228 B2   11/2015 Haberland et al.
(Continued)

FOREIGN PATENT DOCUMENTS

CN   102906591 A   1/2013
CN   107037408 A   8/2017
(Continued)

OTHER PUBLICATIONS

International Preliminary Report on Patentability directed to related International Patent Application No. PCT/EP2020/065130, completed Mar. 18, 2021, with attached English-language translation; 12 pages.

(Continued)

*Primary Examiner* — Bernarr E Gregory
*Assistant Examiner* — Remash R Guyah
(74) *Attorney, Agent, or Firm* — Sterne, Kessler, Goldstein & Fox P.L.L.C.

(57) ABSTRACT

The present disclosure relates to a transmitting/receiving device with mobile radio functionality for a motor vehicle, wherein the transmitting/receiving device includes components of: an antenna structure, a high frequency front-end unit coupled to the antenna structure and a computation unit coupled to the high frequency front-end unit. According to the present disclosure, the transmitting/receiving device is configured to additionally process a radar signal using one or more components, wherein the radar signal has a frequency (f2) that differs by less than a factor of five from a mid- (Continued)

frequency (f1) of the electromagnetic waves forming the corresponding mobile radio signal.

8 Claims, 2 Drawing Sheets

(51) Int. Cl.
    *H01Q 1/32*         (2006.01)
    *H04B 1/00*         (2006.01)
    *H04B 1/3822*       (2015.01)

(52) U.S. Cl.
    CPC ......... *H01Q 1/3208* (2013.01); *H04B 1/0067* (2013.01); *H04B 1/3822* (2013.01)

(58) Field of Classification Search
CPC .... G01S 13/931; G01S 7/2921; G01S 7/2813; G01S 2013/93271; G01S 13/08; G01S 2013/0245; G01S 13/30; G01S 13/12; G01S 15/108; G01S 7/282; G01S 7/414; G01S 7/484; G01S 7/5202; G01S 7/524; G01S 13/00; G01S 13/106; G01S 13/10; G01S 13/18; G01S 13/22; G01S 13/284; H01Q 1/24; H01Q 1/3208; H01Q 1/22; H01Q 1/325; H01Q 21/064; H01Q 21/0025; H01Q 21/005; H01Q 1/50; H01Q 13/0275; H01Q 21/00; G08G 1/096716; G08G 1/096758; G08G 1/096775; B60K 35/00; B60T 2260/08; H01P 3/123; H04L 27/00
USPC ........................................ 372/175
See application file for complete search history.

(56) References Cited

U.S. PATENT DOCUMENTS

| | | |
|---|---|---|
| 9,784,831 B2 | 10/2017 | Kuo et al. |
| 10,261,172 B2* | 4/2019 | Lim ............... G01S 13/931 |
| 10,707,584 B2 | 7/2020 | Kirino et al. |
| 2004/0233045 A1* | 11/2004 | Mays ............... G08G 1/096775 340/901 |
| 2007/0287634 A1 | 12/2007 | Lin et al. |
| 2011/0187579 A1* | 8/2011 | Asada ............... G01S 13/18 375/295 |
| 2013/0106667 A1 | 5/2013 | Fenn et al. |
| 2014/0155001 A1 | 6/2014 | de Graauw et al. |
| 2018/0199342 A1 | 7/2018 | Rai et al. |
| 2019/0058260 A1* | 2/2019 | Kirino ............... H01Q 21/064 |
| 2020/0300971 A1* | 9/2020 | Wodrich ............... G01S 13/931 |

FOREIGN PATENT DOCUMENTS

| | | |
|---|---|---|
| DE | 102006023206 A1 | 11/2006 |
| DE | 102007046471 A1 | 5/2008 |
| DE | 102018120050 A1 | 2/2019 |

OTHER PUBLICATIONS

International Search Report and Written Opinion of the International Searching Authority directed to related International Patent Application No. PCT/EP2020/065130, mailed Nov. 2, 2020, with attached English-language translation; 27 pages.

* cited by examiner

＃ TRANSMITTING/RECEIVING DEVICE FOR A MOTOR VEHICLE AND MOTOR VEHICLE HAVING SUCH A TRANSMITTING/RECEIVING DEVICE

TECHNICAL FIELD

The present disclosure relates to a transmitting/receiving device for a motor vehicle. The transmitting/receiving device is intended to provide mobile radio functionality, which can be used to operate a mobile radio connection from a motor vehicle to a communication partner external to the vehicle. The present disclosure also comprises a motor vehicle having such a transmitting/receiving device.

BRIEF SUMMARY

A transmitting/receiving device for the mobile radio functionality of a motor vehicle can be implemented by interconnecting the following components: an antenna structure, a high frequency (HF) front end unit coupled to the antenna structure and a computation unit coupled to the HF front-end unit, e.g. a digital signal processor (DSP). The antenna structure is used to receive and transmit electromagnetic waves. On the one hand, the HF front-end unit can provide for an amplification of a mobile radio signal in the high-frequency range at the mid-frequency of the electromagnetic waves. Additionally, the HF front-end unit can have a mixer, which can convert the mobile radio signal between the high-frequency range and the baseband, which is a lower-frequency range than the high-frequency range. Another name for HF front-end unit is a radio frequency (RF) front-end unit. In the baseband range, signal processing can be carried out by the computation unit such that the mobile radio protocol can be provided for the mobile radio signal and/or a connection to a communication partner can be managed by a protocol stack. Audio data for a telephone call and/or computer communication data for an Internet connection and/or control device communication can be transmitted via a mobile radio connection. These can be embedded in or extracted from the mobile radio signal by the computation unit.

In addition to the mobile radio functionality, a further antenna structure having a downstream HF front-end unit connected to a computation unit can be provided in order to provide radar functionality in the motor vehicle. At least one object in the region surrounding the motor vehicle can be located by the radar functionality. For this purpose, an electromagnetic wave is transmitted at a radar frequency and an echo of the wave reflected against the at least one object is received.

Thus, in a motor vehicle there is a need to accommodate or arrange a plurality of antenna structures together with an associated HF front-end unit and a downstream computation unit.

In this context, DE 10 2006 023 206 A1 discloses an antenna system with combined antenna device which compactly arranges two different antennas in one housing for two different radio functionalities (GPS reception and short-range communication).

DE 10 2007 046 471 A1 discloses encapsulating an antenna and using an antenna chip, a substrate and an antenna structure arranged thereon for this purpose. This encapsulated antenna can be used for radar functionality. Radar waves having different frequencies can be generated by switching between the different frequency ranges.

DE 10 2018 120 050 A1 teaches that an antenna structure can be designed as an antenna array in order to thereby set a changeable, adjustable radiation characteristic and reception characteristic of the antenna structure. The direction of the strongest radiation and the greatest reception sensitivity can be set by configuring the antenna array. This is known as beamforming or orienting a main beam (main lobe).

US 2004/0233045 A1 describes an information acquisition and transmission system for a motor vehicle in which all the received data and data to be transmitted are fed back via a central processor. The system has an antenna, via which radio connections to units external to the vehicle can be made possible.

It is known from US 2013/0106667 A1 that an antenna array can be used for a WiFi functionality for simultaneous transmission and reception and can process both horizontally and vertically polarized electromagnetic waves.

From US 2007/0287634 A1 a radar system is disclosed which can carry out a spatial scan by pivoting a radar beam.

The object of the present disclosure is to compactly accommodate the components for a mobile radio functionality and the components for a radar functionality in a motor vehicle.

The object is achieved by the subject matter of the independent claims. Advantageous aspects of the present disclosure arise from the dependent claims, the following description, and the figures.

The present disclosure provides a transmitter-receiver with mobile radio functionality for a motor vehicle. The transmitter-receiver has, as components the following.

As one component, the transmitter-receiver has an antenna including an antenna array capable of generating a first electromagnetic waves of a mobile radio signal to be transmitted and for receiving second electromagnetic waves of a received mobile radio signal, As another component, the transmitter-receiver has an HF front-end circuit coupled to the antenna, the HF front-end circuit capable of up-mixing the mobile radio signal to be transmitted (i.e. from the baseband into the frequency range of the electromagnetic waves) and down-mix the received mobile radio signal (i.e. from the frequency range of the electromagnetic waves to the baseband) and As a further component, the transmitter-receiver has a computation circuit coupled to the HF front-end unit, the computation circuit is configured to convert, map or transmit between the relevant mobile radio signal (i.e. the mobile radio signal to be transmitted and/or received) and the communication data contained or transmitted in the mobile radio signal. In the aforementioned manner, such communication data can be, for example, data from a mobile radio protocol and/or connection management and/or user data. Audio data (for example a telephone call) and/or device communication data (for example data from an Internet connection and/or control device communication) can be provided as useful data.

In other words, the present disclosure assumes that all components for providing the mobile radio functionality are provided in the transmitting/receiving device and are also configured for providing the mobile radio functionality.

In order to also allow radar functionality, i.e. radar location of objects in a region surrounding the motor vehicle, in a space-saving manner, the present disclosure provides that the transmitting/receiving device is configured to additionally process a radar signal. In other words, at least one of the said components in the transmitting/receiving device is also configured or provided to emit an electromagnetic wave of a radar signal and to receive back the wave (echo) reflected against an object and to infer from the echo a location and/or a relative speed of the particular object or to derive it from the echo. Both the mobile radio signal and the radar signal are therefore routed via the relevant component.

In order to have dual use of at least one component according to the present disclosure, i.e. for the mobile functionality and the radar functionality, the present disclosure provides that electromagnetic waves are provided with frequencies for the radar signal that differ from the mid-frequency of the electromagnetic waves of the corresponding mobile radio signal (transmitted and/or received mobile radio signal) by less than a factor of 5. In other words, the radar frequency is no more than 5 times higher than the mid-frequency of the electromagnetic waves of the mobile radio signal, or, conversely, the radar frequency is no more than 5 times less (⅕) than the mid-frequency of the electromagnetic waves of the corresponding mobile radio signal. In particular, the difference is less than a factor of 3, preferably less than a factor of 2. This makes it possible to have dual use of at least one of the said components, because its components can be selected appropriately in terms of dimensions (for the antenna structure) and/or characteristic values (frequency response/transmission behavior) for processing both the mobile radio signal and the radar signal. If there is a greater difference in frequencies, however, it is usually not possible to use a component to process signals from both frequency ranges.

The present disclosure results in the advantage that at least one of the components of the mobile radio functionality has a dual use in order to provide the radar functionality and, as a result, this component does not have to be provided in duplicate.

In order to implement the present disclosure, it can be provided, for example, that the mid-frequency of the electromagnetic waves is in a frequency range from 25 gigahertz to 75 gigahertz. The frequency for the electromagnetic waves of the radar signal can be in a frequency range from 20 gigahertz to 90 gigahertz. However, it can also be provided that the mid-frequency for the electromagnetic wave of the mobile radio signal is in a range from 3 gigahertz to 10 gigahertz and the radar signal is generated with a frequency of less than 50 gigahertz.

An HF front-end unit is also known as a Radio Frequency (RF) front end. An HF front-end unit can in particular have a bandpass filter for tuning to a mid-frequency of the electromagnetic waves and/or an amplifier, called a Low Noise Amplifier (LNA), and/or a mixer with an oscillator, a Local Oscillator (LO). An example of a receiving HF front-end unit is a superheterodyne receiver.

A mobile radio application of the motor vehicle can be supported by means of the mobile radio functionality, for example handsfree telephony. A radar application of the motor vehicle can be supported by means of the radar functionality, for example monitoring a surrounding region.

According to one aspect of the present disclosure, the antenna structure is designed as an antenna array, that is to say there is a plurality of partial antennas or sub-antennas which, offset from one another, simultaneously emit the electromagnetic wave. A phase offset (time delay) can be provided for the individual sub-antennas. The signals of the sub-antennas can be generated and/or received separately from one another or, alternatively, the mobile radio signal can, by means of an analog antenna circuit, be divided between the sub-antennas or received by the sub-antennas and combined into a single antenna signal. The said computation unit is configured to use beamforming to orient a particular maximum directional sensitivity of the antenna array (the so-called orientation of the beam or main beam) for the electromagnetic waves of the radar signal, on the one hand, and for the electromagnetic waves of the corresponding mobile radio signal, on the other hand, in different directions. In other words, the antenna array is used to set a different antenna characteristic (emission and/or reception characteristic) for the radar signal than for the corresponding mobile radio signal. In this way, the relevant maximum directional sensitivity or the so-called main beam (or simply beam) or the main lobe can advantageously be oriented toward a base station or another receiver or transmitter for the mobile radio functionality, and during this time the main beam or the main lobe can be oriented toward objects in a region surrounding the motor vehicle (for example, toward other vehicles) in order to locate them for the radar signal.

According to an additional or alternative aspect of the present disclosure, the computation unit is configured to apply echo suppression of the mobile radio functionality to the radar signal. Such an echo suppression is an algorithm to compensate for an echo in the received mobile radio signal, as in the case of the echo reception due to superimposition of the electromagnetic wave received via the direct reception path and a reflection of the same electromagnetic wave, as can be caused, for example, by a reflection against a building. Such an algorithm for echo suppression can also be applied to the radar signal when the computation unit is used jointly. In this way, for example, a ground reflection is compensated for in the radar signal.

According to another aspect of the present disclosure, the computation unit is configured to sign the radar signal using a vehicle-specific signature. In other words, on the basis of the signature, a radar echo can be used to identify whether it is a radar signal from the transmitting/receiving device or a radar signal from another transmitting/receiving device arranged in the vicinity. In this way, for example, two motor vehicles cannot interfere with each other when locating with their radar signals. The signature is implemented here in particular by means of an orthogonal code of the mobile radio functionality. Such an orthogonal code can be based on a gold code, for example.

The present disclosure also comprises aspects which yield additional advantages.

In one aspect of the present disclosure, the antenna structure is used as a common component. The antenna structure is configured to generate and/or receive the electromagnetic waves of the radar signal on the one hand and the electromagnetic waves of the corresponding mobile radio signal on the other hand with different polarities and/or frequencies. For example, a distinction can be made between horizontally polarized waves and vertically polarized waves. Additionally or alternatively, a differentiation or separation according to frequencies can be provided. This has the advantage that the radar signal and the mobile radio signal can be routed at the same time via the antenna structure and a differentiation or separation between the radar signal and the mobile radio signal is still possible on the basis of the polarity. For example, the mobile radio signal and the radar signal can be separated in the antenna structure.

In one aspect of the present disclosure, the HF front-end unit is configured to route the electromagnetic waves of the radar signal and the electromagnetic waves of the corresponding mobile radio signal via the same antenna structure, and in this case to keep separate the radar signal and the corresponding mobile radio signal by means of a time division multiplexing method (time slot method) and/or by means of a frequency division multiplexing method (different, disjoint frequency intervals for radar signal and mobile radio signal). The HF front-end unit is therefore connected to the antenna structure and thus operates the individual antenna structure in order to be able to transmit and/or receive both for the radar signal and for the corresponding mobile radio signal. In order to differentiate between radar signal and mobile radio signal, the antenna structure is used in the time division multiplexing method for only one of the signals (radar signal or mobile radio signal). It is switched alternately between radar signal and mobile radio signal. In the time slot procedure, the usage takes place in different, disjoint time intervals. A simultaneous use of the antenna structure for radar signal and mobile radio signal can be achieved by the frequency division multiplexing method.

In one aspect of the present disclosure, the HF front-end unit is designed to use a bandpass filter to split the radar signal and the mobile radio signal, which is received simultaneously via the same antenna structure but is at a different frequency, into a mobile radio signal and a radar signal and to provide and/or process them separately.

In one aspect of the present disclosure, the HF front-end unit is configured to amplify the radar signal and the corresponding mobile radio signal by means of the same output amplifier and/or the same input amplifier in a time division multiplexing method and/or a frequency division multiplexing method, and/or to mix them by means of the same mixer. By means of the mixing, the radar signal and the mobile radio signal can be mixed or transmitted between the transmission frequency band (with the mid-frequency for the electromagnetic waves) and the baseband (frequency range with the direct component. If the working frequency range of an input amplifier and/or output amplifier is wide enough, both the frequency band of the radar signal and, separately therefrom, the frequency band of a mobile radio signal can be amplified at the same time. In the case of a mixer, the time division multiplexing method is particularly advantageous.

In one aspect of the present disclosure, the computation unit is configured to carry out an obstacle location for zero steering of the beamforming by transmitting and/or receiving the mobile radio signal by means of a locating unit. The locating unit can be implemented, for example, as a program module of the computation unit. With beamforming, zero steering can be used to orient the direction of the lowest sensitivity (zero) by means of the antenna array. For this purpose, there are algorithms in the prior art for obstacle location which determine the direction in which the greatest interference for the mobile radio signal is arranged. For example, a so-called adaptive filter can iteratively determine the direction. Algorithms for this are available in the prior art. Now, however, an obstacle for a mobile radio signal is at the same time an object in the region surrounding the motor vehicle that should be located by means of the radar signal. Accordingly, the radar signal can also be processed by means of the same locating unit, only an inverse processing having to be provided in such a way that an obstacle, which is provided for zero steering of the beamforming in the mobile radio functionality, provides for an object location based on the radar signal by means of the same locating unit, that is, by processing the radar signal, those spatial directions in which an object must be located are determined iteratively, for example by means of the same adaptive filter. Thus, an algorithm for zero steering of the beamforming from the mobile radio functionality can be used to process a radar signal in order to make the detected obstacles recognizable as objects in the region surrounding the motor vehicle.

One aspect of the present disclosure makes use of the fact that, with an antenna array, the orientation of the main lobe or the main beam is adaptive or can be changed over time. This can be achieved within the antenna array by means of an analog circuit by changing the relative phases between the sub-antennas or by processing the mobile radio signal and/or the radar signal individually for each sub-antenna by the computation unit in order to set a separate phase offset for each sub-antenna. In this aspect, the computation unit is configured to use beamforming to pivot the beam of the radar signal, that is to say the main lobe or the main beam, according to a predetermined scanning pattern for scanning the region surrounding the transmitting/receiving device. The scanning pattern can provide, for example, line-by-line and/or column-by-column scanning or a line-by-line and/or column-by-column sweeping of the surrounding region with the beam. As a result, a spatial resolution of the radar image or the radar scan can be implemented by means of the radar signal.

The present disclosure also comprises a motor vehicle having at least one transmitting/receiving device. The transmitting/receiving device can, for example, provide an antenna structure which is arranged in a front bumper or rear bumper or on one side of the vehicle, for example in the side mirrors. An antenna structure can also be provided on a roof of the motor vehicle because, as already described, a beam for radar functionality can be pivoted 360 degrees around the motor vehicle in a horizontal plane by means of beamforming, while a beam can be directed toward a mobile radio station for mobile radio functionality.

The motor vehicle according to the present disclosure is preferably designed as a car, in particular as a passenger car or truck or as a passenger bus or motorcycle.

The present disclosure also comprises the combinations of the features of the described aspects.

Aspects of the present disclosure are described below.

BRIEF DESCRIPTION OF THE DRAWINGS/FIGURES

DETAILED DESCRIPTION

The description below are preferred aspects of the present disclosure. In the aspects described, the described components each represent individual features of the present disclosure which are to be considered to be independent of one another and which each further develop the present disclosure independently of one another. Therefore, the disclosure shall also comprise combinations of the features of the aspects other than the ones presented. Furthermore, the described aspects may also be supplemented by further features of the present disclosure as already described.

In the figures, the same reference signs refer to functionally identical elements.

Figure 1:
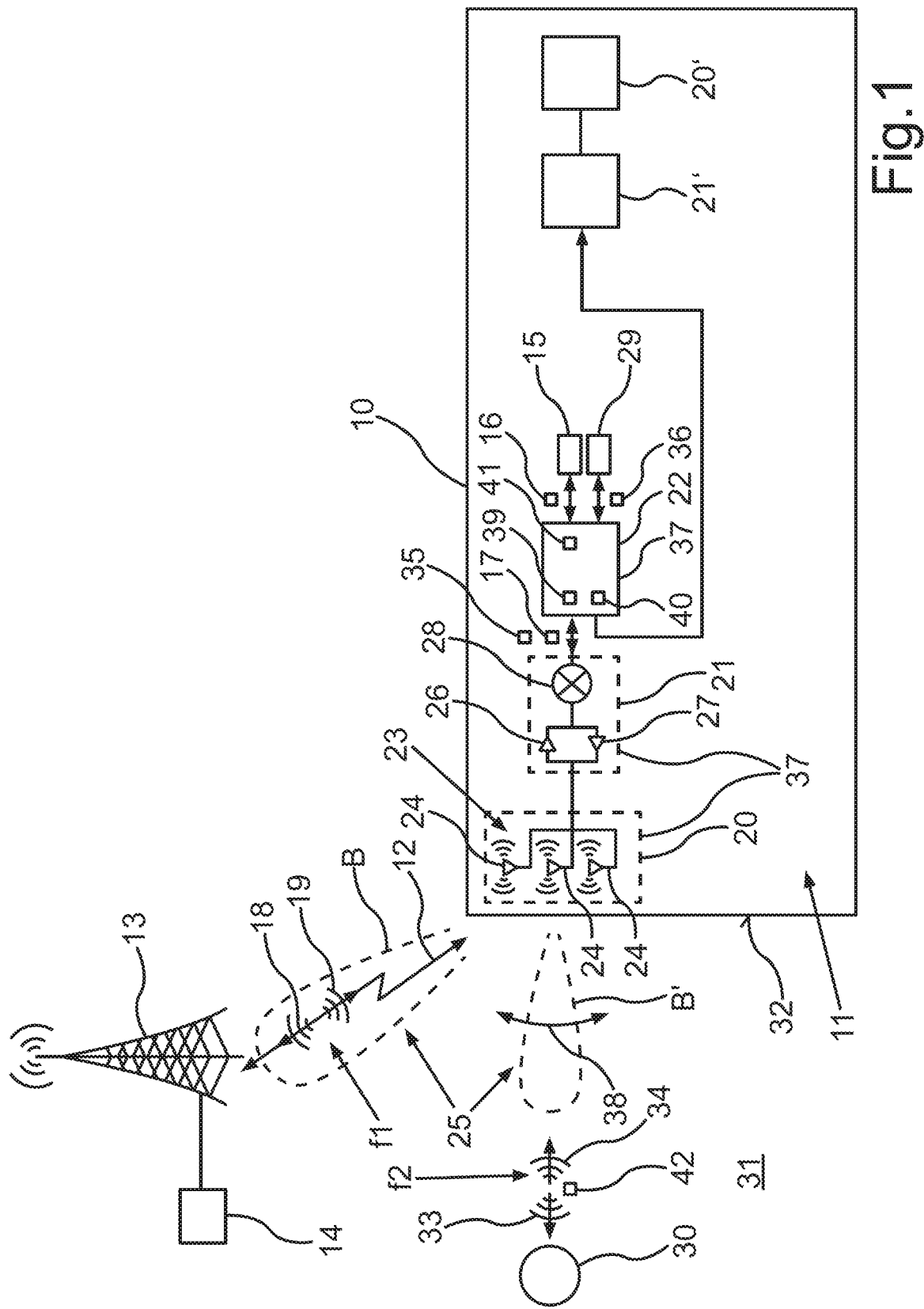
FIG. 1 is a schematic illustration of one aspect of the motor vehicle having a transmitting/receiving device.

FIG. 1 shows a motor vehicle 10, which may be an automobile, in particular a passenger car or truck or a passenger bus. The motor vehicle 10 can have a transmitting/receiving device 11 which can be configured to operate a mobile radio connection 12 between the motor vehicle 10 and a base station 13 of a mobile radio network 14. In this way, a mobile radio application 15 can be provided in the motor vehicle 10, for example mobile radio telephony and/or data transmission for an Internet connection, for example. As a result, communication data 16 for the mobile radio application 15 can be transmitted and/or received via the mobile radio connection 12 to the mobile radio network 14. The communication data 16 can be converted to a mobile radio signal 17 (transmission), or the communication data 16 can be extracted from the mobile radio signal 17 (reception), and, by means of the transmitting/receiving device 11, the mobile radio signal 17 can then be transmitted as an electromagnetic wave 18 and/or an electromagnetic wave 19 containing a mobile radio signal 17 can be received. For this purpose, the transmitting/receiving device 11 can have one or more antenna structures 20, 20' that can be located at different points on the motor vehicle, one or more HF front-end units 21, 21' and a computation unit 22.

The antenna structure 20 can be provided for receiving the electromagnetic wave 19 and/or for generating the electromagnetic wave 18. The antenna structure 20 can have an antenna array 23 with sub-antennas 24. A beamforming 25 can be provided by means of the antenna array 23, by means of which a beam or a main lobe B can be formed or provided for the mobile radio connection 12. The antenna structure 20 can be coupled to the computation unit 22 via the HF front-end unit 21. The HF front-end unit 21 can have an input amplifier 26 for received mobile radio signals 17 and an output amplifier 27 for mobile radio signals 17 to be transmitted. The HF front-end unit 21 can have a mixer 28 in order to convert between a transmission frequency range/reception frequency range on the one hand (high frequency) and a baseband. The baseband can be converted between the mobile radio signal 17 and the communication data 16 by the computation unit 22. For example, a mobile radio protocol, for example a protocol stack, can be implemented by the computation unit 22. The computation unit 22 can be based, for example, on at least one digital signal processor and/or at least one microprocessor.

At least one further HF front-end unit 21' with an antenna structure 20' coupled thereto can be connected to the computation unit 22.

In the case of the motor vehicle 10, a radar application or radar application 29 can furthermore be provided which can implement a location of at least one object 30 in a region surrounding 31 the motor vehicle 10. FIG. 1 shows how the location of the object 30 can be carried out, for example, in the region of a front 32 of the motor vehicle z10. The radar application 29 can, for example, be part of an autonomous driving function.

The transmitting/receiving device 11 can provide a radar functionality for the radar application 29, that is to say an electromagnetic wave 33 of a radar signal can be transmitted which can be reflected against the object 30. The echo 34 resulting from the reflection, that is to say the reflected electromagnetic wave, can then be received by the transmitting/receiving device 11, and a radar signal 35 can be generated therefrom, on the basis of which object data 36 for describing the at least one located object 30 can be provided to the radar application 29.

In the transmitting/receiving device 11, the antenna structure 20, the HF front-end unit 21 and the computation unit 22 each represent a component 37 of the transmitting/receiving device 11. At least one of the components 37, preferably two, in particular all of the components 37, are used in the motor vehicle 10 for processing both the mobile radio signal 17 and the radar signal 35.

Thus, by means of the antenna structure 20, the electromagnetic wave 33 can also be generated and the echo 34 received. For this purpose, it can be provided that a mid-frequency f1 for the mobile radio connection 12 and a frequency f2 for the electromagnetic waves of the radar signal (electromagnetic wave 33 and echo 34) differ in relation to the mid-frequency f1 for the mobile radio connection 12 by a factor of 5 at most. In particular, a difference of less than a factor of 3, in particular less than a factor of 2, is preferred.

The antenna structure 20 can thus also be used to generate the electromagnetic wave 33. In particular, a beam B' can also be generated by means of the beamforming, that is to say a main lobe which can be oriented into the surrounding region 31 in order to locate an object 30. In particular, a pivoting 38 of the beam B' can also be provided in order to achieve a spatial resolution of the location.

The HF front-end unit 21 can also be used to amplify and/or mix the radar signal 35. For both the mobile radio signal 17 and the radar signal 35, the computation unit 22 can provide digital signal processing, for example the beamforming 39, an echo suppression 40 and/or an obstacle location 41.

In the motor vehicle 10, the transmitting/receiving device 11 thus results in a shared use of at least one antenna array 23 for mobile radio and radar. In this way, mobile radio functionality and radar functionality can jointly use front/rear/side antennas of the motor vehicle 10. A differentiation between the signals for mobile radio/radar (mobile radio signal/radar signal 35) can be achieved, for example, by different polarization for mobile radio/radar (for example horizontal and vertical) and/or by different time slots for mobile radio and radar and/or by bandpass filters. It is also possible to use the HF front-end device jointly for mobile radio and radar; thus, the same output and input amplifiers 26, 27 can be used for mobile radio and radar, for example by means of a time slot method, or an additional amplifier can be provided for the radar signal in addition to a low/mid/high amplifier for the mobile radio signal. A connection of a plurality of HF front-end units for radar and mobile radio to a common computation unit 22 can also be provided. For example, a front/rear and side/HF transmission unit can be connected to a central computation unit 22, which can be based, for example, on at least one DSP.

In the computation unit, the mobile radio signal and the radar signal can be evaluated simultaneously or with a time delay by, for example, also using a DSP or an ASIC (application-specific integrated circuit) from the mobile radio sector for the radar signal 35. This is because technologies such as echo suppression 40, which can now also advantageously be provided for the radar signal 35, are used in the mobile radio functionality.

By using adaptive beamforming or pivoting 38, a higher resolution of the radar functionality can be achieved. For example, 8×8 beamforming can be implemented. The surrounding region 31 can be scanned line by line and the echoes 34 can be evaluated.

The use of technologies from the mobile radio sector for the radar signal 35 thus results in greater interference immunity in the radar functionality. In addition, the greater interference immunity can also be used by modulating the radar signal to imprint a signature 42. Thus, when the echo 34 is received, a distinction can be made as to whether it is an echo 34 relating to the radar signal 35 or the electromagnetic wave 33 or an echo from a different vehicle. This can be achieved, for example, by the electromagnetic wave 33 being generated as a unique output signal using an orthogonal code for the radar signal 35.

In particular, it is provided that the antenna structure acts as a single antenna, that is to say it does not have two antennas that can be operated independently of one another.

In this case, however, the described division and sub-antennas can be provided, wherein all individual sub-antennas of the antenna structure 20 are able to be controlled separately, for example for 4×4 MiMo (multiple input multiple output) or beamforming.

The orthogonal codes can therefore also be provided for the mobile radio signal 17.

Figure 2:
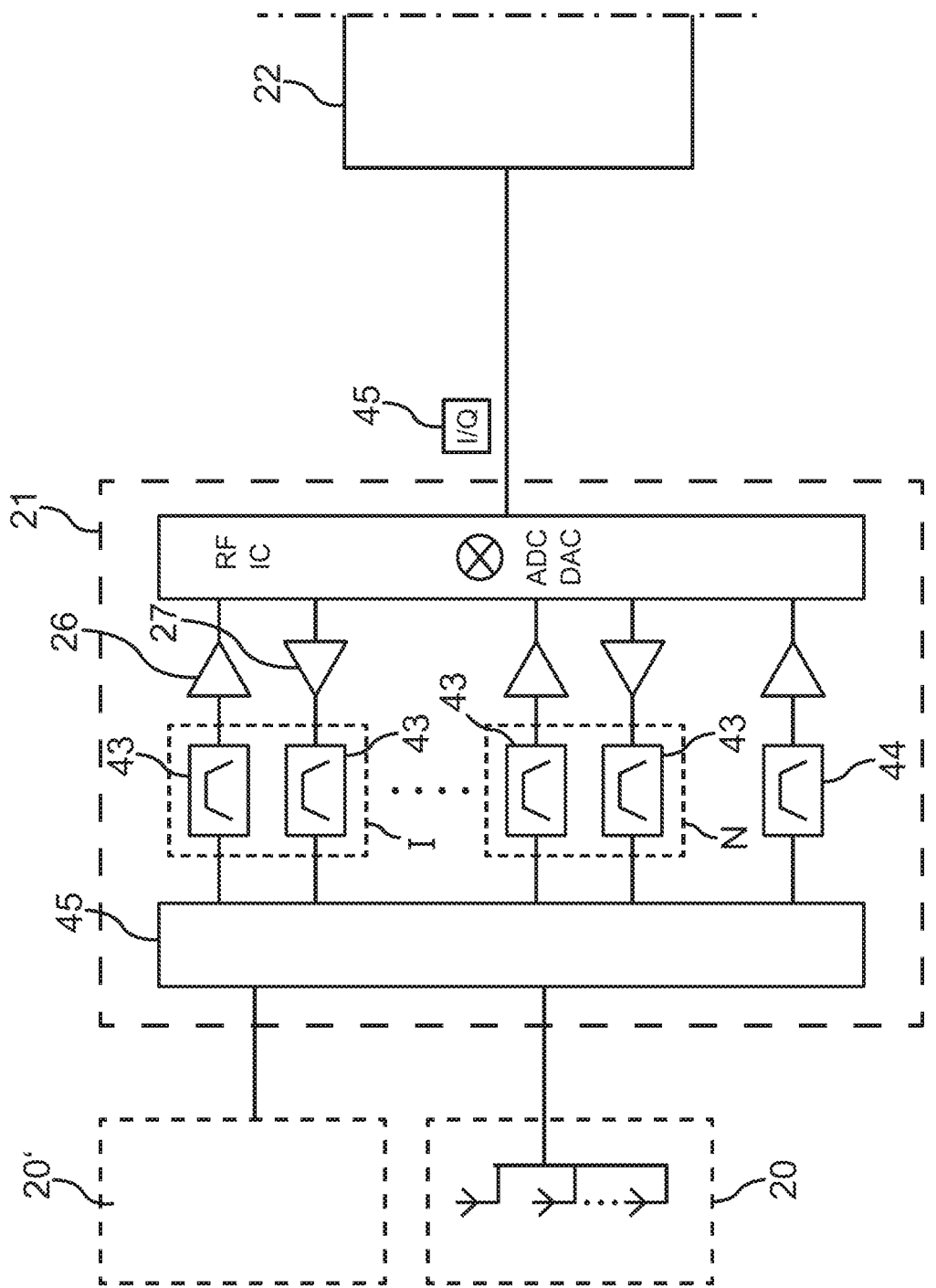
FIG. 2 is a schematic representation of a design of an HF front-end unit for an aspect of the transmitting/receiving device shown in FIG. 1.

FIG. 2 shows a possible design of the HF front-end unit 21, which can have the following elements.

HF front-end 21 can have several input amplifiers 26 and output amplifiers 27, each with its own bandpass filter 43 for mobile radio bands or radar bands (a plurality of filter pairs I to N are shown, each of which provides a transmission channel via an output amplifier 27 and a reception channel via an input amplifier 26 for a frequency band. N is the total number of filter pairs. There are N different frequency bands);

HF front-end 21 can have a bandpass filter 44 for the radar echo 34;

HF front-end 21 can have a multiplexer 45 for switching the electrical signals from the antenna structure 20 to different mobile radio or radar bands and/or into the antenna structure 20;

HF front-end 21 can have an integrated circuit RF-IC (for example having at least one mixer and/or analog-to-digital converters ADCs and digital-to-analog converters DACs).

Thus, digital/sampled I/Q data (45), which can contain the mobile radio signal 17 and the radar signal 35, can already be available for the computation unit 22. However, an analog interface with the computation unit 22 can also be used.

One or more HF front-end units 21 can be connected to a computation unit 22. A plurality of antenna structures 20, 20' can in turn be connected to an HF front-end unit.

Overall, the examples show how the present disclosure can be used to merge mobile radio and radar.

The invention claimed is:

1. A transmitter-receiver with mobile radio functionality for a motor vehicle, the transmitter-receiver comprising:
    an antenna, wherein the antenna comprises an antenna array configured to:
        generate a first electromagnetic wave, wherein the first electromagnetic wave is associated with a mobile radio signal to be transmitted, and
        receive a second electromagnetic wave, wherein the second electromagnetic wave is associated with a mobile radio signal to be received;
    a high frequency front-end circuit coupled to the antenna, the high frequency front-end circuit configured to up-mix the mobile radio signal to be transmitted and further configured to down-mix the mobile radio signal that is received; and
    a computation circuit coupled to the high frequency front-end circuit, the computation circuit configured to convert between the mobile radio signal and communication data transmitted in the mobile radio signal,
        wherein the transmitter-receiver is configured to process a radar signal associated with a third electromagnetic wave, the third electromagnetic wave having a frequency that differs by less than a factor of five from a mid-frequency of the first and second electromagnetic waves of the corresponding mobile radio signal,
        wherein the computation circuit is further configured to use beamforming to orient a relevant maximum directional sensitivity of the antenna array for the third electromagnetic wave associated with the radar signal in a different direction from the first and second electromagnetic waves of the corresponding mobile radio signal,
        wherein the computation circuit is further configured to implement a zero steering of the beamforming, wherein the zero steering of the beamforming orients a direction of a lowest sensitivity for transmitting and receiving of the mobile radio signals,
        wherein the computation circuit is further configured to implement a locating algorithm to carry out an obstacle location during the zero steering of the beamforming for transmitting and receiving the mobile radio signal,
        wherein the locating algorithm for the zero steering of the beamforming for transmitting and receiving the mobile radio signals is further used to process the radar signal in order to translate detected obstacles to recognizable objects in a region surrounding the motor vehicle, wherein the detected obstacles were detected during the zero steering of the beamforming for transmitting and receiving the mobile radio signal, and
        wherein the computation circuit is further configured to sign the radar signal with a vehicle-specific signature, the vehicle-specific signature being based on an orthogonal code of the mobile radio functionality.

2. The transmitter-receiver according to claim 1, wherein the antenna is further configured to generate and receive the third electromagnetic wave of the radar signal and the first and second electromagnetic waves of the corresponding mobile radio signal with different polarities or frequencies.

3. The transmitter-receiver according to claim 1, wherein the high frequency front-end circuit is further configured to conduct the third electromagnetic wave of the radar signal and the first and second electromagnetic waves of the corresponding mobile radio signal via the antenna while keeping the radar signal and the corresponding mobile radio signal separate by at least one of time division multiplexing or frequency division multiplexing.

4. The transmitter-receiver according to claim 1,
    wherein the high frequency front-end circuit is further configured to transmit the radar signal and the mobile radio signal such that each signal has a different frequency and both signals are received at the same time by the antenna, and
    wherein the high frequency front-end circuit is further configured to use a bandpass filter to separate the radar signal from the mobile radio signal to be processed separately.

5. The transmitter-receiver according to claim 1, wherein the high frequency front-end circuit is further configured to amplify the radar signal and the corresponding mobile radio signal using at least one of an output amplifier, an input amplifier, or a mixer and at least one of time division multiplexing, frequency division multiplexing, or mixing the radar signal and the corresponding mobile radio signal.

6. The transmitter-receiver according to claim 1, wherein the computation circuit is further configured to pivot, using beamforming, a beam of the radar signal according to a predetermined scanning pattern for scanning the region surrounding the motor vehicle.

7. The transmitter-receiver according claim 1, wherein the computation circuit is further configured to apply echo suppression of the mobile radio functionality to the radar signal.

8. A motor vehicle, comprising:
a transmitter-receiver with mobile radio functionality, the transmitter-receiver comprising:
   an antenna wherein the antenna comprises an antenna array configured to:
      generate a first electromagnetic wave, wherein the first electromagnetic wave is associated with a mobile radio signal to be transmitted, and
      receive a second electromagnetic wave, wherein the second electromagnetic wave is associated with a mobile radio signal to be received;
   a high frequency front-end circuit coupled to the antenna, the high frequency front-end circuit configured to up-mix the mobile radio signal to be transmitted and further configured to down-mix the mobile radio signal that is received; and
   a computation circuit coupled to the high frequency front-end circuit, the computation circuit configured to convert between the mobile radio signal and communication data transmitted in the mobile radio signal,
      wherein the transmitter-receiver is configured to process a radar signal associated with a third electromagnetic wave, the third electromagnetic wave having a frequency that differs by less than a factor of five from a mid-frequency of the first and second electromagnetic waves of the corresponding mobile radio signal,
      wherein the computation circuit is further configured to use beamforming to orient a relevant maximum directional sensitivity of the antenna array for the third electromagnetic wave associated with the radar signal in a different direction from the first and second electromagnetic waves of the corresponding mobile radio signal,
      wherein the computation circuit is further configured to implement a zero steering of the beamforming, wherein the zero steering of the beamforming orients the direction of the lowest sensitivity for transmitting and receiving of the mobile radio signal,
      wherein the computation circuit is further configured to implement a locating algorithm to carry out an obstacle location during the zero steering of the beamforming for transmitting and receiving the mobile radio signal and to carry out the object location using the radar signal,
      wherein the locating algorithm for the zero steering of the beamforming for transmitting and receiving the mobile radio signal is further used to process the radar signal in order to translate detected obstacles to recognizable objects in a region surrounding the motor vehicle, wherein the detected obstacles were detected during the zero steering of the beamforming for transmitting and receiving the mobile radio signal, and
      wherein the computation circuit is further configured to sign the radar signal with a vehicle-specific signature, the vehicle-specific signature being based on an orthogonal code of the mobile radio functionality.

* * * * *